United States Patent [19]
Saito

[11] Patent Number: 5,504,933
[45] Date of Patent: Apr. 2, 1996

[54] PAY BROADCASTING SYSTEM

[75] Inventors: Makoto Saito, Tokyo, Japan

[73] Assignee: Mitsubishi Corporation, Tokyo, Japan

[21] Appl. No.: 143,912

[22] Filed: Oct. 26, 1993

[30] Foreign Application Priority Data

Oct. 27, 1992 [JP] Japan .................... 4-289074

[51] Int. Cl.$^6$ .................................. H04N 7/167
[52] U.S. Cl. .................. 455/2; 348/3; 348/12; 348/13; 380/20; 380/21
[58] Field of Search ................. 455/2, 3.1, 3.2, 455/5.1, 6.3; 348/1, 3, 4, 6, 7, 8, 10, 12, 13; 380/9, 10, 20, 21; H04N 7/16, 7/167, 7/173, 7/20, 7/10

[56] References Cited

U.S. PATENT DOCUMENTS

| | | | |
|---|---|---|---|
| 4,225,884 | 9/1930 | Block et al. ................. | 348/3 |
| 4,527,195 | 7/1985 | Cheung . | |
| 4,567,512 | 1/1986 | Abraham ................. | 348/7 |
| 4,623,918 | 11/1986 | Chomet . | |
| 4,710,955 | 12/1987 | Kauffman . | |
| 4,751,732 | 6/1988 | Kamitake . | |
| 4,862,268 | 8/1989 | Campbell et al. ................ | 348/463 |
| 4,916,737 | 4/1990 | Chomet et al. ................ | 380/20 |
| 5,046,093 | 9/1991 | Wachob ................ | 380/20 |
| 5,060,262 | 10/1991 | Bevins, Jr. et al. . | |
| 5,144,663 | 9/1992 | Kudelski et al. . | |

FOREIGN PATENT DOCUMENTS

| | | | |
|---|---|---|---|
| 0199410 | 10/1986 | European Pat. Off. . | |
| 0341801 | 11/1989 | European Pat. Off. . | |
| 0489385 | 6/1992 | European Pat. Off. . | |
| 3717261 | 11/1987 | Germany ................. | H04N 1/67 |
| 0284499 | 10/1993 | Japan ................. | H04N 1/67 |
| 2231244 | 11/1990 | United Kingdom . | |
| 8503830 | 8/1985 | WIPO . | |
| WO89/09528 | 10/1989 | WIPO . | |
| 9307715 | 4/1993 | WIPO . | |

*Primary Examiner*—David E. Harvey
*Attorney, Agent, or Firm*—Hecker & Harriman

[57] ABSTRACT

A system for the so-called "pay-per-program" is provided for viewing individual program on pay basis without signing a comprehensive contract. In response to a request for viewing a pay program executed via public telephone line from an applicant for viewing, a charging center sends a viewing permit code for viewing a pay program to a data communication device and collects a fee for the pay program. Upon receipt of the viewing permit code, a receiving device offers the pay program according to the viewing permit code. The broadcasting program is scrambled by three modes of fixed, selective and change. The request for viewing is executed in three modes by specifying time, program number and temporary number. As the viewing permit code, one of three modes is adopted: decode data, non-opened program number or decode data number.

7 Claims, 12 Drawing Sheets

PAY BROADCASTING SYSTEM

BACKGROUND OF THE INVENTION

The present invention relates to a system, in which a broadcasting program is offered on a pay basis in satellite television broadcasting, cable television broadcasting, or in terrestrial television broadcasting service via broadcasting satellite (BS) or communication satellite (CS).

In the information-oriented society of today, satellite television broadcasting via broadcasting satellite (BS) or communication satellite (CS), as well as cable television broadcasting, called CATV (cable television), using coaxial cable or optical fiber cable, are increasingly propagated.

Also, multiplex teletext broadcasting for separately transmitting character information via television wave is also being propagated.

In some of these satellite television broadcasting systems, unlike conventional type terrestrial television broadcasting, to which anybody is entitled to have access, a scrambled television program is transmitted so that only the subscribed viewers who signed the viewing contract can view the program, and the subscribed viewers receive the program on a pay basis using a tuner/decoder, which can descramble the program.

In order to view the program on such pay satellite television broadcasting, it is necessary to use a special-purpose tuner/decoder. The tuner/decoder is provided with an ID code, which is transmitted regularly (e.g. once monthly) from a satellite, and only the tuner/decoder receiving the transmitted ID code can descramble the program.

The procedure to select and transmit ID for a viewer who signed a viewing contract is very troublesome, and an ID code is not transmitted unless the contract is signed in advance. Even when the viewer wants to view a pay-per-view program, there is no method of contracting for pay-per-program on occasion, and thus, the viewer cannot view the program upon request.

Because the tuner/decoder is provided with ID which corresponds to each transmitting station, as many tuner/decoders as the number of transmitting stations are needed to view programs of many pay satellite television stations.

In CATV, which can transmit several tens of channels at the same time, special channels for broadcasting motion pictures, sports programs, music programs, etc. are broadcast in addition to general channels, which are not scrambled and can be viewed under a comprehensive contract. The programs of such special television channels are transmitted as scrambled pay television channels. To view the programs in the scrambled channels, it is necessary to sign a contract for descrambling. Because the contract period is normally renewed in approximately one month intervals, it is not possible to view the programs under a contract signed at any desired time.

In order to have access to a live sports program, motion picture program or music program to be broadcast through the scrambled satellite television broadcasting or CATV channels, there is a special system in which a viewing time recorder is installed on each television set, and the fee is to be paid by deferred payment based on the actually viewed programs. However, much labor is required for the control and fee collection for such system.

When a television viewer receives programs from terrestrial or satellite television broadcasting and secondarily distributes them to a number of display devices, general television viewers may have to pay for some of the programs due to copyright even though the programs are offered free of charge from the original broadcasting station.

In this way, if the viewer wants to distribute the program from terrestrial or satellite television broadcasting on a pay basis, there is no means to contract for individual programs as in the cases of viewing satellite television broadcasting or CATV programs, and each viewer must sign a subscription contract for each channel for the distribution.

To solve the above problems, the present inventors have filed Japanese Patent Application No. 4-199942, which discloses a charging system, whereby a charging center sends a viewing permit code for viewing a pay program to a data communication device in response to a request for viewing the pay program and a request for distribution of a broadcasting program, which are executed from a pay-per-program viewer via a public telephone line using a data communication device. The charging center also collects a fee for such program, and a receiving device displays a pay program according to the viewing permit code when it accepts the viewing permit code.

In the following, description will be given on the above invention.

FIG. 1 shows a television charging system of the present invention. The television charging system comprises a satellite television broadcasting system 1, a CATV system 2, a multiplex teletext broadcasting system 3 using terrestrial television broadcasting, and a charging system 4.

In the satellite television broadcasting system 1 using BS or CS, reference numeral 11 represents a terrestrial station of satellite television broadcasting, and television wave including a program code and a scrambled television signal is transmitted from a satellite communication transmitting antenna 12 to a geostationary satellite 13 on a geostationary orbit about 30,000 km above the equator.

When the television wave from satellite communication transmitting antenna 12 is received, the geostationary satellite 13 amplifies the received television wave, converts it to a frequency on the order of 10 GHz, and transmits it to the ground.

The viewer receives the television wave of 10 GHz from the geostationary satellite 13 by a satellite television broadcasting receiving antenna 14, and the wave is converted to a frequency on the order of 1 GHz and is sent to a satellite television broadcasting receiving tuner/decoder 15. The satellite broadcasting receiving tuner/decoder 15 picks up a video signal and an audio signal from the television wave, sends them directly as video and audio signals to a television set or converts them again to a frequency receivable by the television set.

This satellite broadcasting system itself is the same as a conventional system, while, in this satellite television broadcasting, the program is scrambled, and only the viewers having the viewing permit code for descrambling the program can view the television program.

In CATV system 2, reference numeral 21 represents a CATV broadcasting center, 22 represents a coaxial cable or an optical fiber cable for transmitting TV signal, and 23 represents a CATV adapter/decoder. CATV adapter/decoder 23 picks up a video signal and an audio signal from a CATV signal and descrambles them by a decode signal. Further, the signals are sent directly as video and audio signals to the television set or by converting them to a frequency receivable by the television set.

In the multiplex teletext broadcasting system 3, reference numeral 31 is a terrestrial multiplex teletext broadcasting station for transmitting a television signal with multiplex teletext on a television wave program as terrestrial television wave from a television transmitting antenna 32. The transmitted terrestrial television wave is received by a television wave receiving antenna 33, and multiplex teletext signal is picked up from the television signal by a multiplex teletext adapter 34. The signal is distributed to display devices 35, 35, 35, . . . such as a video monitor, LED (light emitting diode) display device, LCD (liquid crystal device) display unit, display-phone, personal computer display unit, etc.

On the other hand, the charging system 4 comprises a charging center 41, a public telephone line 42 and a data communication device 43.

In this charging system 4, the pay-per-viewer makes a request for viewing to the charging center 41 through the public telephone line 42 by the data communication device 43 such as display-phone.

Upon receipt of the request from the pay-per-viewer, a viewing permit code for viewing a pay program is sent from the charging center 41 to the data communication device 43.

The viewing permit code sent to the data communication device 43 is sent to a satellite broadcasting tuner/decoder 15, a CATV adapter/decoder 23 or a multiplex teletext adapter 34 on-line via a parallel data line, a serial data line of RS-232C standard, or an ordinary public telephone line using a modem, or off-line via a semiconductor memory unit, such as IC card, memory card, etc., or a magnetic memory unit such as a magnetic card, magnetic disk, etc.

Upon receipt of the viewing permit code, the satellite broadcasting tuner/decoder 15, CATV adapter/decoder 23 or multiplex teletext adapter 34 descrambles the program, to which an identifying information corresponding to the viewer permit code had been given, and a television signal is sent to a television set 16 or 24 or teletext signal is sent to display devices 35, 35, 35, . . . . Thus, the viewable picture is displayed on the television set 16 or 24, and the character signal is displayed on the display devices 35, 35, 35, . . . .

On the other hand, the information of a fee for each pay program and the viewing permit code for each pay program are sent in advance from the satellite broadcasting terrestrial station 11, the CATV center 21 or the terrestrial wave broadcasting station 31 to the charging center 41. The charging center 41 collects the fee from the viewers who request for viewing on behalf of the satellite broadcasting terrestrial station 11, the CATV center 21 or the terrestrial wave broadcasting station 31.

The charging center and the communication device are connected by public telephone line, and account is settled via the public telephone line.

As the charging system, various methods can be utilized such as a method to use a fee collecting system included in the public telephone line system, a method to use a home banking system by banks, a method to use a mail sales system in credit system, or a VAN system.

In order that only the viewers who paid the fee can view the broadcasting program and the others cannot view it, the broadcasting program is scrambled. Various methods have been proposed for the scrambling, and typical methods include a line permutation system and a line rotation system for the video signal and a PN signal adding system for the audio signal.

Description will be given below on the information to be transmitted and received in this system, referring to FIG. 2 and FIG. 3. Shown in these figures is the information to be transmitted and received in this system, and each information is transmitted and received between broadcasting stations such as BS, CS, CATV, etc., receiving devices with tuner and decoder, charging centers, and data communication devices such as display phones, modem, etc. The broadcasting station and the receiving device are connected by radio wave or cable, and the charging center and the data communication device are connected by public telephone line. The broadcasting station and the charging center, and further, the receiving device and the data communication device are coupled directly, or by on-line communication means such as radio wave or cable, or by off-line means such as magnetic card, magnetic disk or memory card.

FIG. 2 shows a system for viewing a pay broadcasting program. The broadcasting station sends a viewing permit code for viewing a broadcasting program to a charging center before the program is broadcast, and also sends scrambled broadcasting program, which can be descrambled by the viewing permit code, to the receiving device. In this case, a program number for identifying the broadcasting program can be transmitted with the broadcasting program.

When the viewer makes a request for viewing a television program to the charging center via a public telephone line using the data communication device, the charging center sends the viewing permit code, which has been sent from the broadcasting station before the program is broadcast, to the data communication device. The viewing permit code sent to the data communication device is sent to the receiving device. The program is descrambled according to the viewing permit code by the receiving device when the desired broadcasting program is broadcast, and the desired program is displayed or recorded when the receiving device outputs the program to a television set (TV) or to a video tape recorder (VTR).

FIG. 3 represents a system to distribute a program such as multiplex teletext broadcasting program. In this broadcasting distribution system, the broadcasting station sends a distribution permit code for distributing a broadcasting program and a program number for identifying the broadcasting program to a charging center before the program is broadcast, and the program, such as multiplex teletext broadcasting program, which can be distributed according to the distribution permit code, to the receiving device together with the program number.

When a viewer, who wants to distribute a program, requests the distribution to the charging center via public telephone line, the charging center sends a distribution permit code and a program number, which have been sent from the broadcasting station before the program is broadcast, to the data communication device. The distribution permit code and the program number sent to the data communication device are sent to the receiving device when the requested program is broadcast, and the receiving device distributes the program to the display unit (DSP) according to the distribution permit code.

SUMMARY OF THE INVENTION

In the charging system according to the present invention, the broadcasting system comprises a broadcasting station for broadcasting a program via terrestrial waves, CATV, and satellites, such as BS, CS, etc., and a charging center for operating the entire charging system.

On the other hand, the viewing system on the side of viewers to view the broadcasting program comprises a receiving device coupled with a tuner/decoder and a data communication device for communicating with the charging center.

It is an object of the present invention to provide a system, by which it is possible to actualize the so-called pay-per-program for viewing each program on a pay basis or the so-called pay-per-view for viewing a program on a pay basis without signing a contract, using a charging system.

To attain the above system, it is disclosed in the present invention how the scrambled pattern can be protected, how the program to be viewed is identified, how a viewing request should be made, and how these means are applied on a pay broadcasting system.

To maintain security of the scramble, it is proposed to adopt a method to use a scramble pattern fixed for a certain period, a method to prepare a plurality of scramble patterns and select a scramble from them, or a method to use a scramble pattern by changing it.

For the method to use a scramble pattern by fixing it for a certain period, the currently used system can be utilized without any change, but the scramble pattern may be decoded.

In the method to prepare a plurality of scramble patterns and use one of them, it is difficult to decode the scramble patterns because the scramble patterns must be decoded only during the broadcasting of the program, but there may be some possibility to decode the scramble patterns because the same scramble patterns are repeatedly used.

In the method to change scramble pattern for each program, it is virtually impossible to decode the scramble pattern because the scramble pattern must be decoded during the broadcasting of the program.

As the method to identify the program, there are a method to identify according to broadcasting time and a method to provide the broadcasting program itself with an identifying information.

As a method to request viewing, there are proposed a method to request according to the broadcasting time and a method to request by using an identifying information of the program itself. If the identifying information is not made public, the viewing request is made using a temporary identifying information.

In case the broadcasting program is not identified according to the time, an identifying information is needed. In case the broadcasting program has an identifying information, which is open, the identifying information is used. If it is not open, a temporary identifying information is used for a viewing request.

The method to identify the program according to the broadcasting time is simple, but it comes to a deadlock if the broadcasting time is changed for some reason.

In contrast, the method to identify the program according to the identifying information requires a more complicated system, but this method can be relied on even when the broadcasting time is changed.

The receiving device identifies the program for which a viewing request has been made and descrambles the requested program using the corresponding decode data.

In case the broadcasting program is identified according to the broadcasting time, the program is descrambled by decode data at the specified broadcasting time.

In case the program number is open, the program number in the broadcasting signal is monitored, and the program is descrambled using decode data when the program number of the requested program is detected.

In case the program number is not made public, the non-opened program number in the broadcasting signal is monitored, and the program is descrambled using decode data when the same program number as encoded number sent from the charging center is detected.

DETAILED DESCRIPTION OF THE INVENTION

Description will be given on the present invention in connection with the drawings.

In the following, description will be given on embodiments of the present invention, referring to FIG. 4 to FIG. 22.

FIG. 4 to FIG. 8 each represents an embodiment in which a pattern used to scramble is fixed and used and the broadcasting station scrambles the program by a fixed scramble pattern and broadcasts it. Also, the broadcasting station sends a decode data, serving as descramble data, to a charging center before the program is broadcasting from the broadcasting station.

Figure 4:
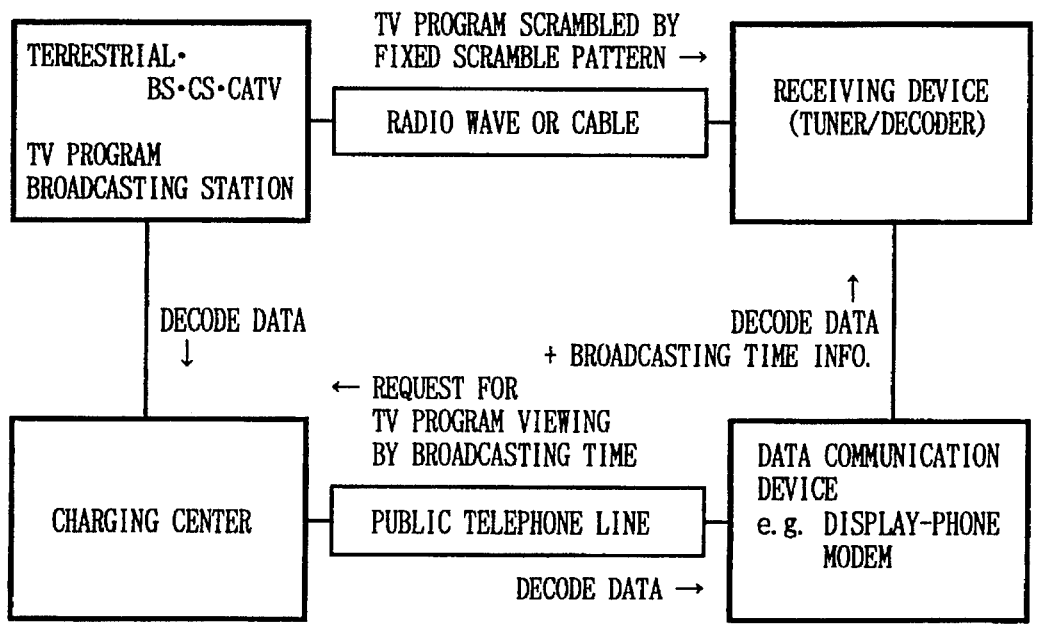
FIG. 4 is a diagram of a first embodiment of the present invention.

In the embodiment of FIG. 4, no program number is used. Of course, the broadcasting station may use the program number, but the program number is not used in this system.

A viewer, who wants to view a program, sends a viewing request to the charging center by specifying the broadcasting time via public telephone line using a data communication device.

The charging center sends decode data of the program, to which the viewing request has been made, to the data communication device via public telephone line and collects a fee for the program.

The data communication device sends the received decode data and broadcasting time information to a receiving device.

Upon receipt of the decode data and the broadcasting time information, the receiving device descrambles the broadcasting program using the decode data.

When a broadcasting station broadcasts a program, a program number is put on each program for control purpose. There are program numbers which are opened or not opened.

Figure 5:
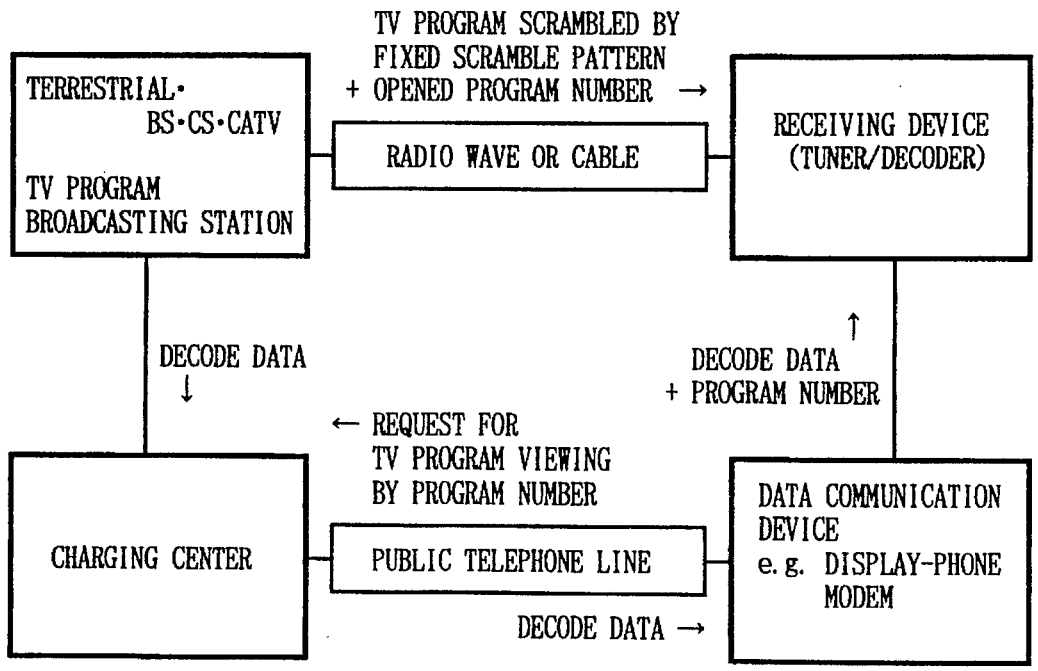
FIG. 5 is a diagram of a second embodiment of the present invention.
Figure 6:
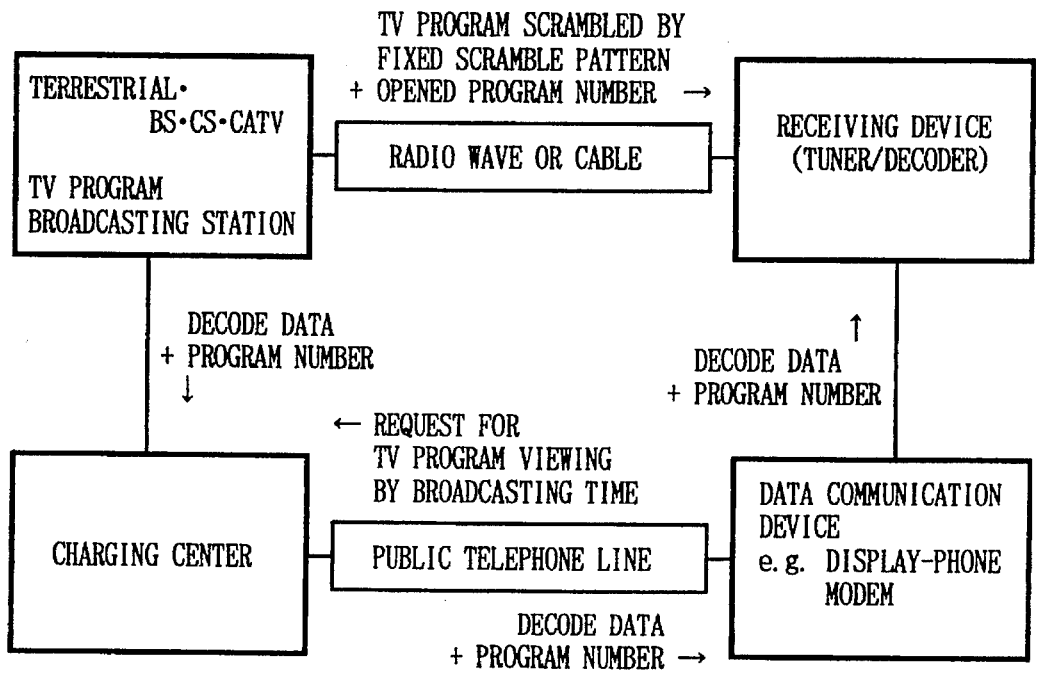
FIG. 6 is a diagram of a third embodiment of the present invention.

FIG. 5 and FIG. 6 each represents an embodiment, which uses an open program number.

In the embodiment shown in FIG. 5, an applicant for viewing a broadcasting program sends a viewing request to the charging center by specifying a program number via public telephone line using a data communication device.

The charging center sends decode data for the broadcasting program, to which the request has been sent, to the data communication device via public telephone line, and also collects a fee for the program.

The data communication device sends the received decode data and the program number to the receiving device.

Upon receipt of the decode data and the program number, the receiving device monitors the program number of the receiving program and descrambles the broadcasting program by the received decode data when the program number of the requested program is detected.

In the embodiment of FIG. 6, the broadcasting station sends the program number to the charging center before the program is broadcast from the broadcasting station.

The applicant for viewing the program sends a request for viewing to the charging center by specifying broadcasting time via a public telephone line using a data communication device.

The charging center sends decode data and the program number of the requested broadcasting program to the data communication device via a public telephone line and also collects a fee for the program.

The data communication device sends the received decode data and the program number to the receiving device.

Upon receipt of the decode data and the program number, the receiving device monitors program number of the receiving program and descrambles the program using the received decode data when the program number of the requested program is detected.

By the system as described above, it is possible for an applicant to request for viewing a program without knowing the program number.

Figure 7:
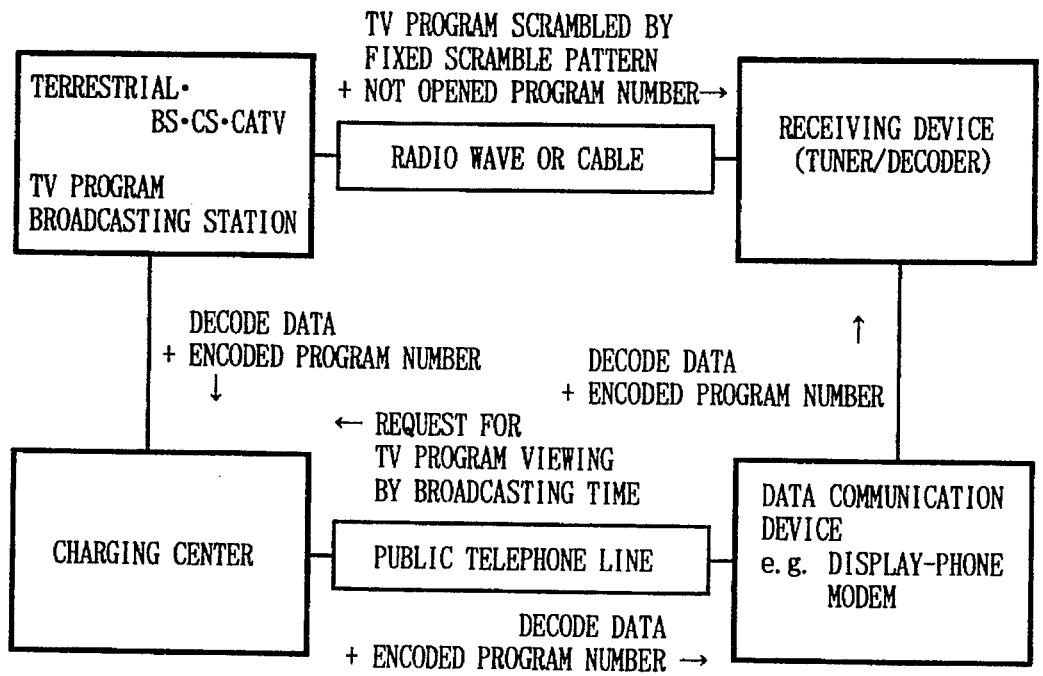
FIG. 7 is a diagram of a fourth embodiment of the present invention.
Figure 8:
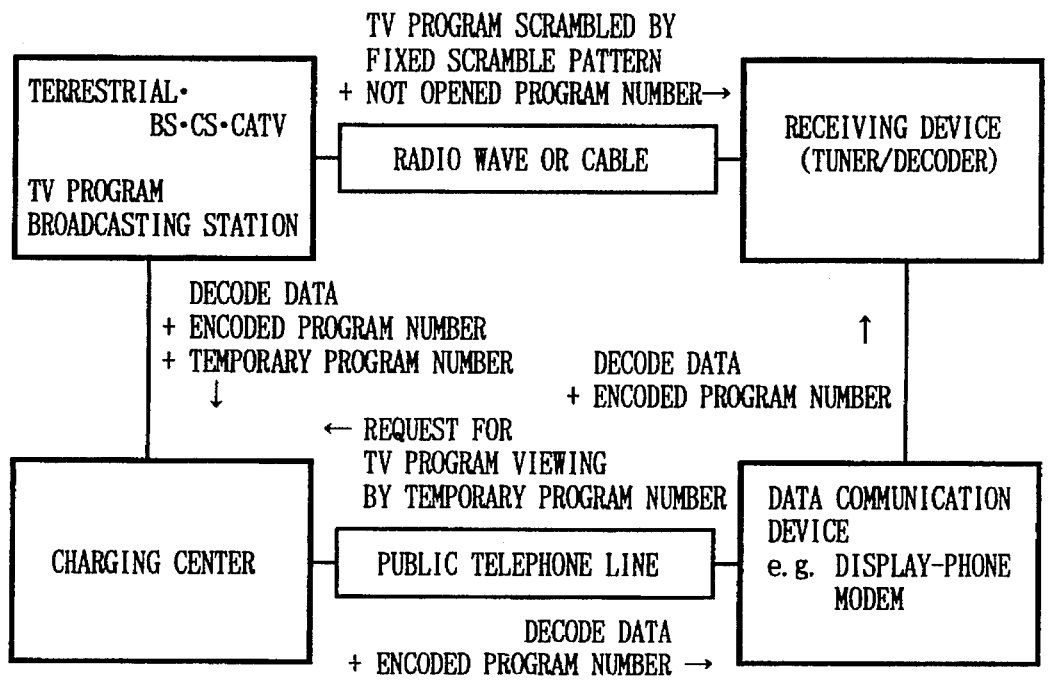
FIG. 8 is a diagram of a fifth embodiment of the present invention.

FIG. 7 and FIG. 8 each represents an embodiment, which uses a non-opened program number, which is not open for operation purpose. In these embodiments, the applicant for viewing uses a non-opened program number, and the program number is used as an encoded program number. The broadcasting station sends the encoded program number to the charging center before the program is broadcast from the broadcasting station.

In the embodiment of FIG. 7, the applicant for viewing sends a request for viewing to the charging center by specifying broadcasting time via public telephone line using the data communication device.

The charging center sends the decode data and the encoded program number of the requested broadcasting program to the data communication device via public telephone line, and also collects a fee for the program.

The data communication device sends the received decode data and the encoded program number to the receiving device.

Upon receipt of the decode data and the encoded program number, the receiving device monitors the non-opened program number of the receiving program and descrambles the requested program by the decode data when the encoded program of the requested program agrees with the non-opened program number.

In the embodiment of FIG. 8, the encoded program number has a temporary program number for requesting the program, and the broadcasting station also sends this temporary program number to the charging center before the program is broadcast from the broadcasting station.

The applicant for viewing the program sends a request for viewing to the charging center by specifying the temporary program number via public telephone line using the data communication device.

The charging center sends the decode data and an encoded program number corresponding to the temporary program number of the requested program to the data communication device via public telephone line, and also collects a fee for the program.

The data communication device sends the received decode data and the encoded program number to the receiving device.

Upon receipt of the decode data and the encoded program number, the receiving device monitors the non-opened program number of the receiving program, and descrambles the program using the received decode data when the encoded program number of the requested program agrees with the non-opened program number.

FIG. 9 to FIG. 17 each represents an embodiment in which a plurality of patterns to be used for scramble are prepared and selected for each program or for each time period, such as day, week, etc., and the broadcasting station scrambles the broadcasting program by a scramble pattern selected from a plurality of scramble patterns.

Figure 9:
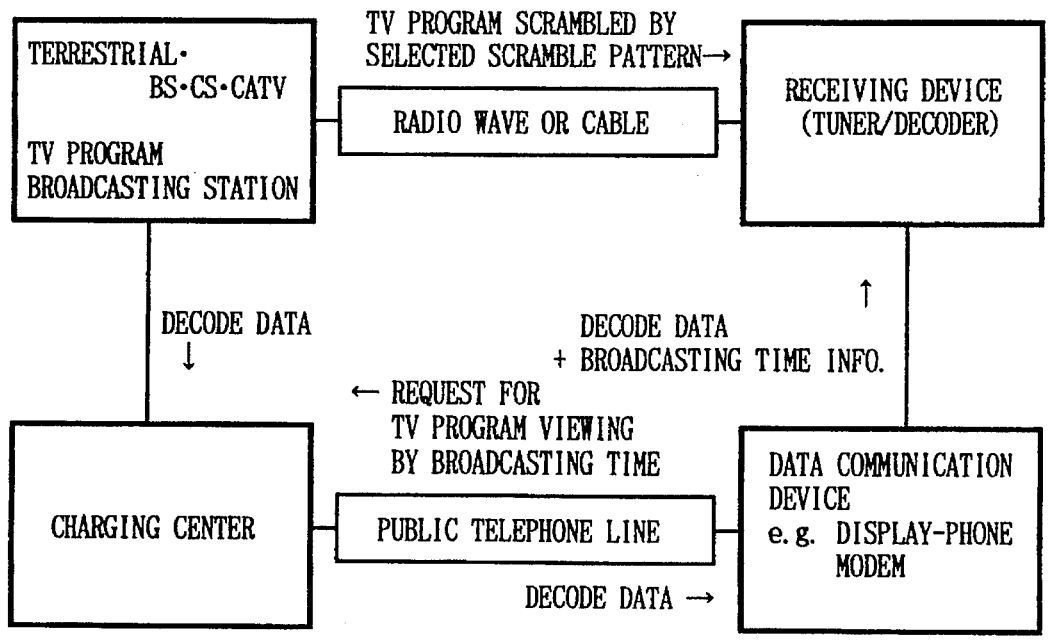
FIG. 9 is a diagram of a sixth embodiment of the present invention.

In the embodiment of FIG. 9, no program number is used. The applicant for viewing a program sends a request for viewing to the charging center by specifying broadcasting time via public telephone line using the data communication device.

The charging center sends the decode data of the requested broadcasting program via public telephone line to the data communication device, and also collects a fee for the program.

The data communication device sends the received decode data and the broadcasting time information to the receiving device.

Upon receipt of the decode data and the broadcasting time information, the receiving device descrambles the broadcasting program using the decode data when it is the specified broadcasting time.

Figure 10:
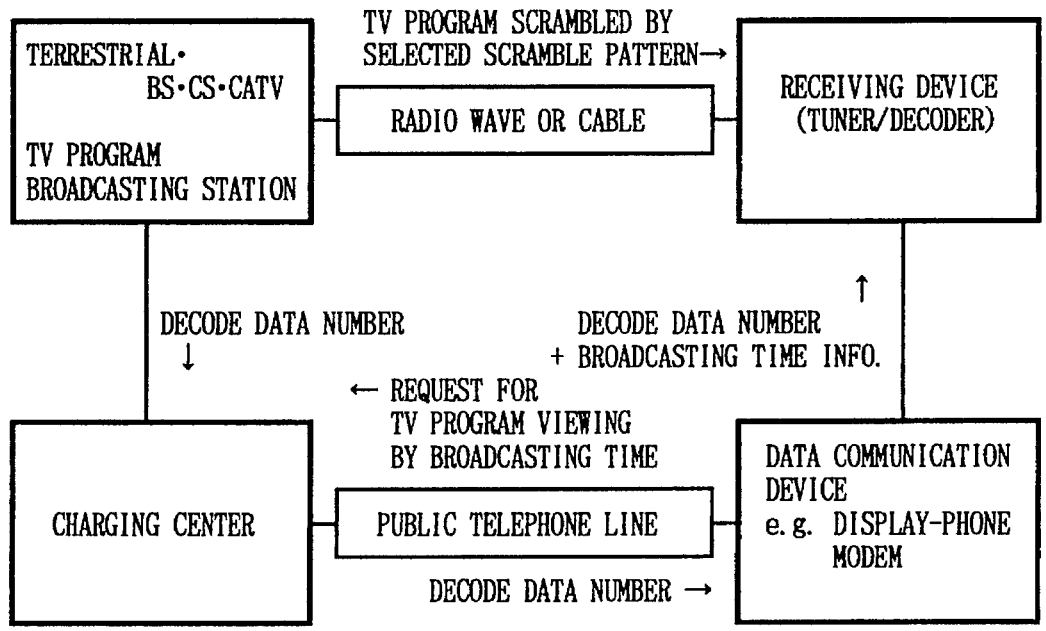
FIG. 10 is a diagram of a seventh embodiment of the present invention.

FIG. 10 represents another embodiment, in which no program number is used.

In this embodiment, a plurality of decode data are provided with decode data number and stored in advance in the receiving device.

The broadcasting station sends a decode data number for identifying the decode data to the charging center before the program is broadcast from the broadcasting system.

The applicant for viewing sends a request for viewing to the charging center by specifying broadcasting time via public telephone line using the data communication device.

The charging center sends the decode data number of the requested program to the data communication device via public telephone line, and also collects a fee for the program.

The data communication device sends the received decode data number and broadcasting time information to the receiving device.

Upon receipt of the decode data number and the broadcasting time information, the receiving device descrambles the program by decode data corresponding to the decode data number at the broadcasting time.

FIG. 11 to FIG. 14 each represents an embodiment in which a program number is used as explained in FIG. 5 and FIG. 6.

Figure 11:
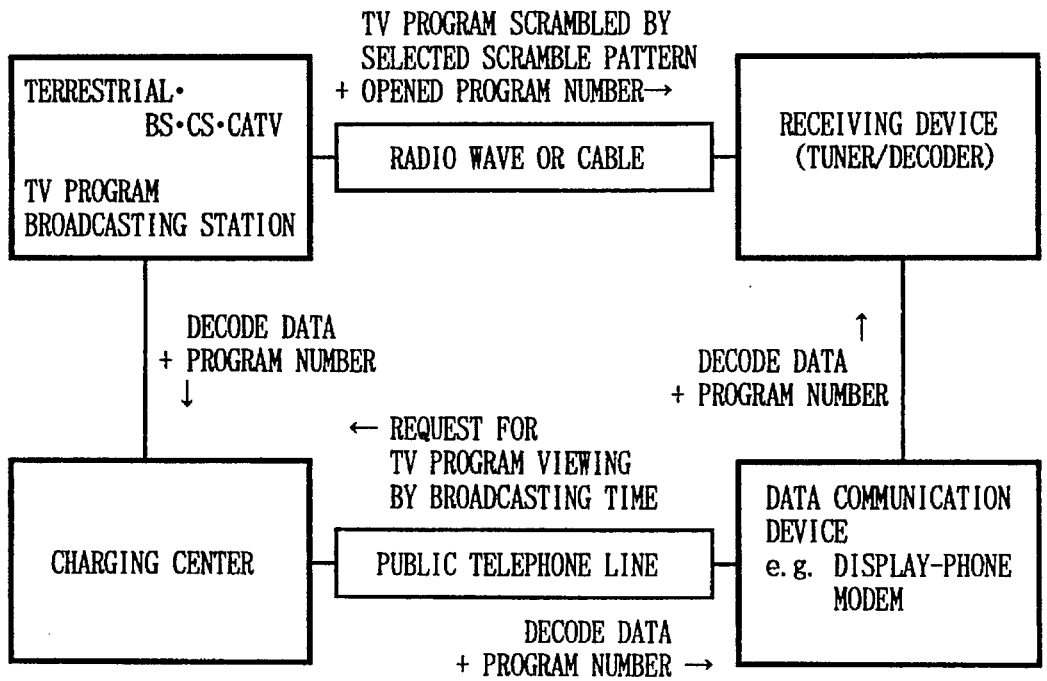
FIG. 11 is a diagram of an eighth embodiment of the present invention.

In the embodiment of FIG. 11, the applicant for viewing sends a request for viewing to the charging center by specifying broadcasting time using the data communication device via public telephone line.

The charging center sends decode data and a program number of the requested program to the data communication device via public telephone line, and also collects a fee for the program.

The data communication device sends the program number and the received decode data.

Upon receipt of the decode data and the program number, the receiving device monitors program number of the receiving program, and descrambles the program using the received decode data when the program number of the requested program is detected.

Figure 12:
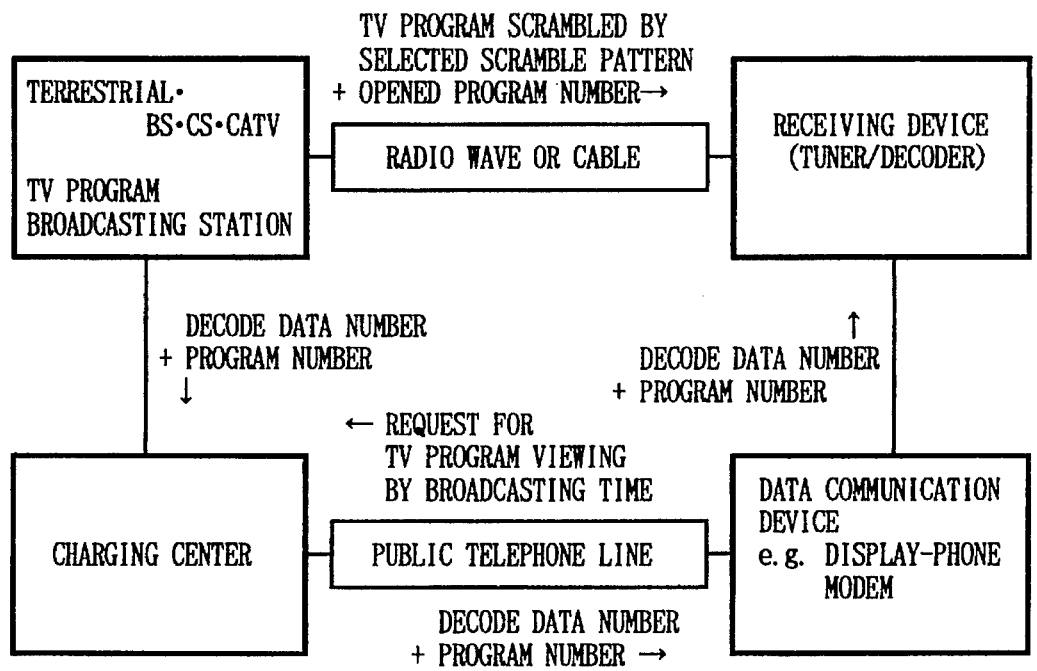
FIG. 12 is a diagram of a ninth embodiment of the present invention.

In the embodiment of FIG. 12, a plurality of decode data are provided with decode data numbers and are stored in advance in the receiving device as in the embodiment of FIG. 10.

The broadcasting station sends a decode data number for identifying the decode data to the charging center before the program is broadcast from the broadcasting station.

In this embodiment, the applicant for viewing sends a viewing request to the charging center by specifying broadcasting time via public telephone line using the data communication device.

The charging center sends the decode data number and the program number of the requested program to the data communication device via public telephone line and also collects a fee for the program.

The data communication device sends the received decode data number and the program number to the receiving device.

Upon receipt of the decode data number and the program number, the receiving device monitors program number of the receiving program, and descrambles the program using decode data corresponding to the received decode data number when the program number of the requested program is detected.

Figure 13:
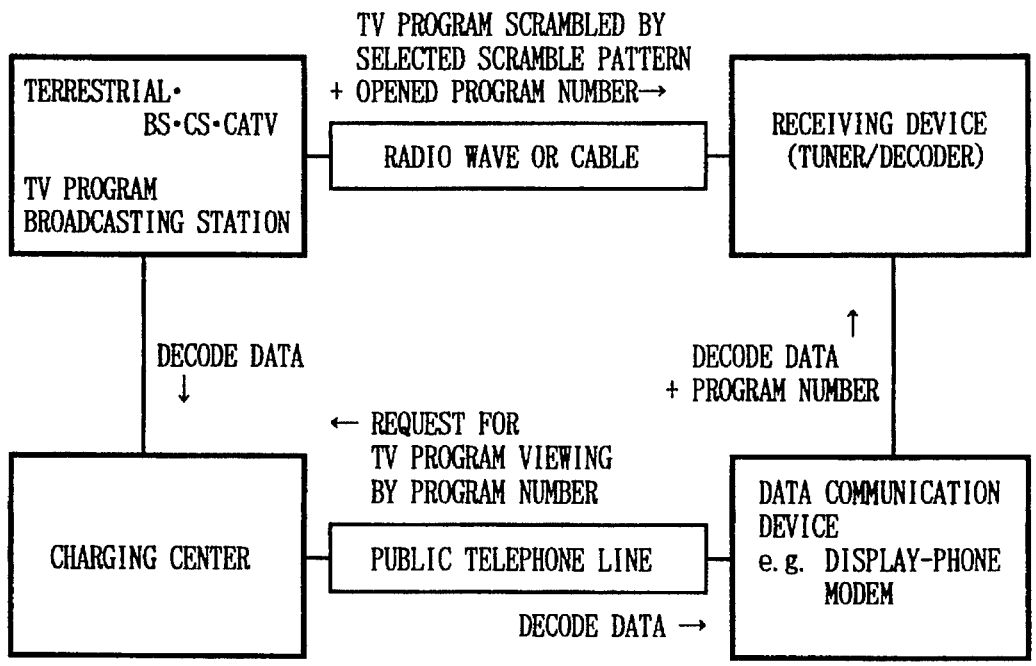
FIG. 13 is a diagram of a tenth embodiment of the present invention.

In the embodiment of FIG. 13, the applicant for viewing sends a viewing request to the charging center by specifying a program number via public telephone line using a data communication device.

The charging center sends decode data of the requested program to the data communication device via public telephone line, and also collects a fee for the program.

The data communication device sends the program number and the received decode data to the receiving device.

Upon receipt of the decode data and the program number, the receiving device monitors program number of the receiving program and descrambles the program by the received decode data when the program number of the requested program is detected.

Figure 14:
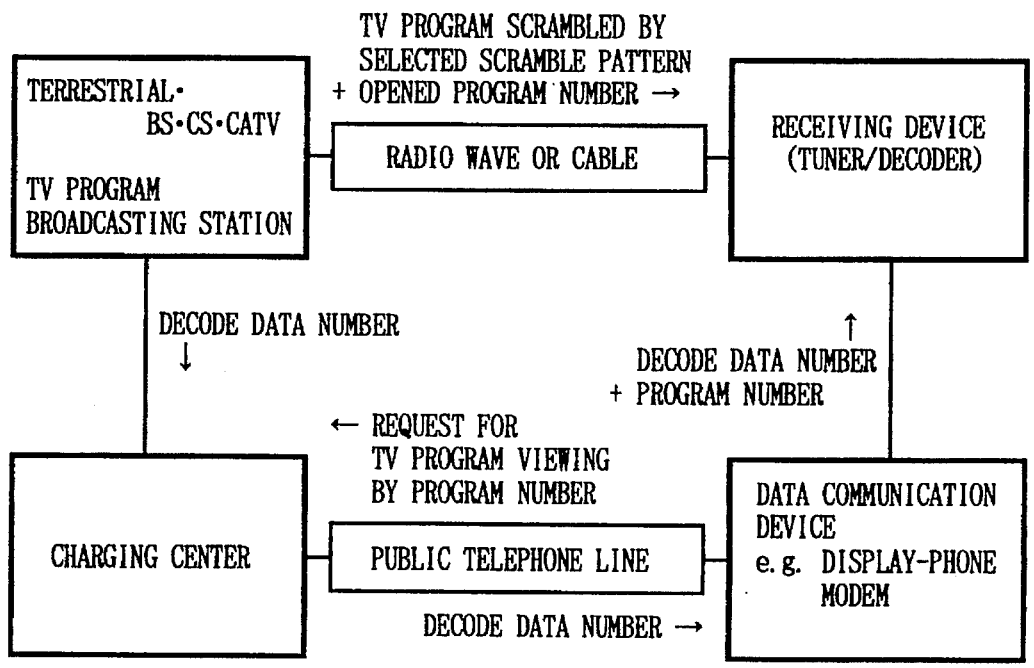
FIG. 14 is a diagram of an eleventh embodiment of the present invention.

In the embodiment of FIG. 14, a plurality of decode data are provided with decode data numbers and are stored in advance in the receiving device as in the embodiment of FIG. 10.

The broadcasting station sends a decode data number for identifying the decode data to the charging center before the program is broadcast from the broadcasting station.

In this embodiment, the applicant for viewing sends a viewing request to the charging center by specifying a program number via public telephone line using the data communication device.

The charging center sends the decode data number of the requested program to the data communication device via public telephone line and also collects a fee for the program.

The data communication device sends the program number and the received decode data number to the receiving device, and the receiving device monitors the program number of the receiving program upon receipt of the program number, and descrambles the program using decode data corresponding to the received decode data number when the program number of the requested program is detected.

Figure 15:
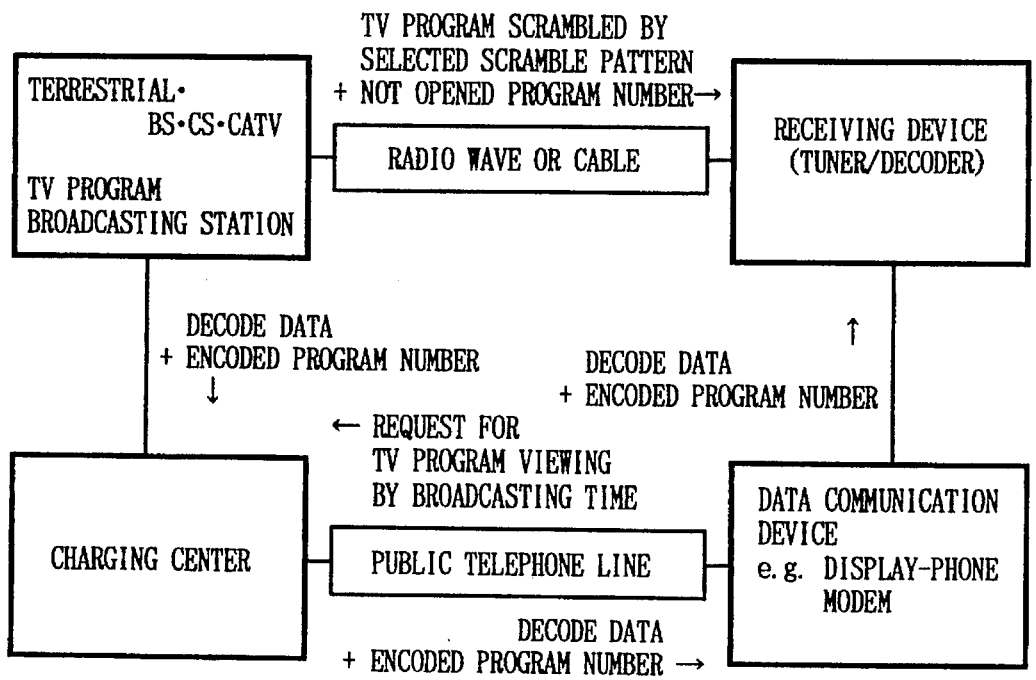
FIG. 15 is a diagram of a twelfth embodiment of the present invention.
Figure 16:
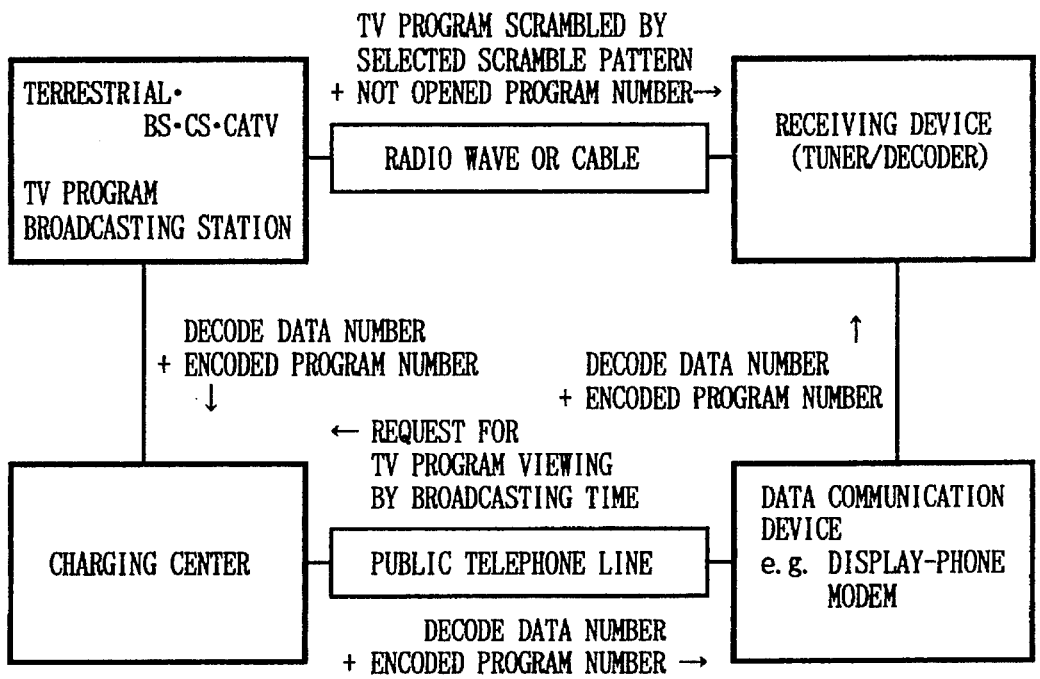
FIG. 16 is a diagram of a thirteenth embodiment of the present invention.
Figure 17:
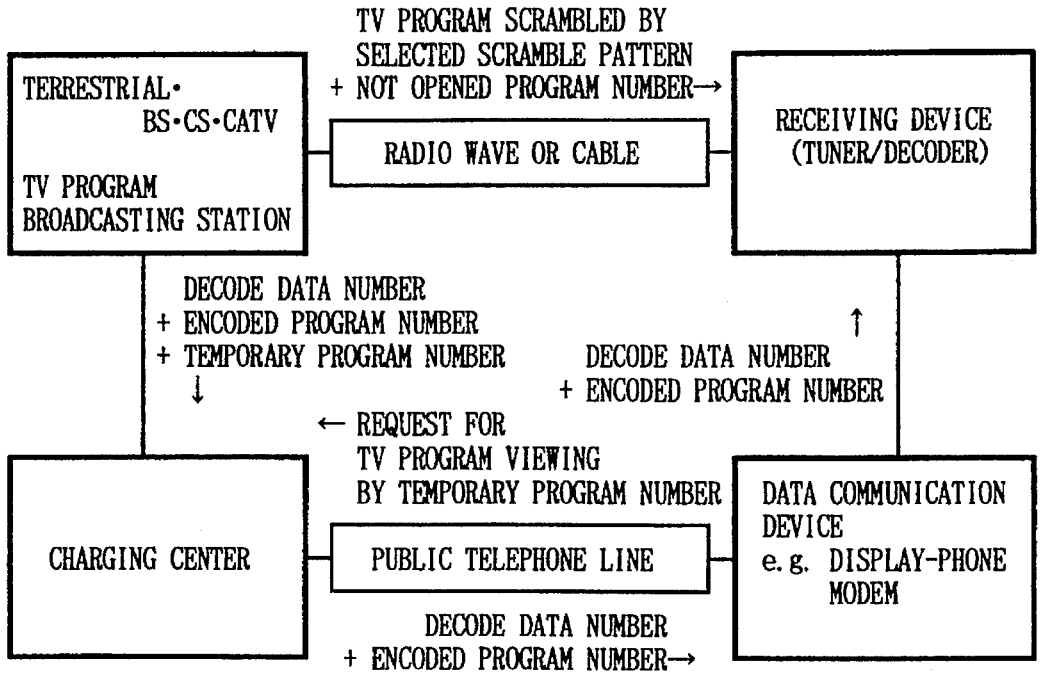
FIG. 17 is a diagram of a fourteenth embodiment of the present invention.

FIG. 15 to FIG. 17 each represents an embodiment in which a non-opened program number is used as in the embodiments of FIG. 7 and FIG. 8. In these embodiments, the non-opened program number is encoded and is sent to the charging center before the program is broadcast from the broadcasting station.

In the embodiment of FIG. 15, the applicant for viewing sends a viewing request to the charging center by specifying broadcasting time via public telephone line using the data communication device.

The charging center sends a decode data and an encoded program number of the requested program to the data communication device via public telephone line and collects a fee for the program.

The data communication device sends the received decode data and the encoded program number to the receiving device.

Upon receipt of the decode data and the encoded program number, the receiving device monitors a non-opened program number of the receiving program and descrambles the program using the received decode data when the encoded program number of the requested program agrees with the non-opened program number.

In the embodiments shown in FIG. 16 and FIG. 17, a plurality of decode data are provided with decode data numbers and are stored in advance in the receiving device as in the embodiment of FIG. 10.

The broadcasting station sends a decode data number for identifying the decode data to the charging center before the program is broadcast from the broadcasting station.

In the embodiment of FIG. 16, the applicant for viewing sends a viewing request to the charging center by specifying broadcasting time via public telephone line using the data communication device.

The charging center sends a decode data number and an encoded program number of the requested program to the data communication device via public telephone line and also collects a fee for the program.

The data communication device sends the received decode data number and the encoded program number to the receiving device.

Upon receipt of the decode data number and the encoded program number, the receiving device monitors non-opened program number of the receiving program and descrambles the program using decode data corresponding to the received decode data number when the encoded program number of the requested program agrees with the non-opened program number.

In the embodiment of FIG. 17, the encoded program number is provided with a temporary program number as in the embodiment of FIG. 8.

The broadcasting station sends also the temporary program number to the charging center before the program is broadcast from the broadcasting station.

The applicant for viewing sends a viewing request to the charging center by specifying a temporary program number via public telephone line using the data communication device.

The charging center sends a decode data number and an encoded program number corresponding to the temporary program number of the requested program to the data communication device via public telephone line and also collects a fee for the program.

The data communication device sends the received decode data number and the encoded program number to the receiving device.

Upon receipt of the decode data number and the encoded program number, the receiving device monitors non-opened program number of the receiving program and descrambles the program by decode data corresponding to the received decode data number when the encoded program number of the requested program agrees with the non-opened program number.

FIG. 18 to FIG. 22 each represents an embodiment in which pattern used in the scramble is not fixed in advance and the broadcasting station changes the scramble pattern for each program as appropriate. For this reason, it is impossible to decode the scramble pattern.

In these embodiments, decode data is sent to the charging center in advance from the broadcasting station.

Figure 18:
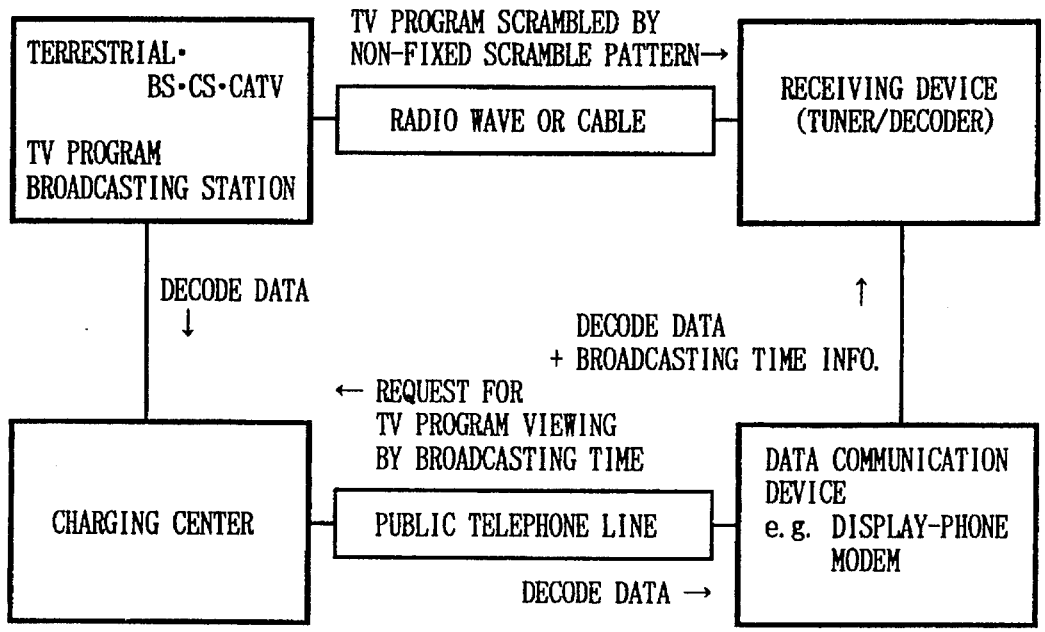
FIG. 18 is a diagram of a fifteenth embodiment of the present invention.

In the embodiment of FIG. 18, the applicant for viewing sends a viewing request to the charging center by specifying broadcasting time via public telephone line using the data communication device.

The charging center sends the decode data of the requested program to the data communication device via public telephone line and also collects a fee for the program.

The data communication device sends the received decode data and broadcasting time information to the receiving device.

Upon receipt of the decode data and the broadcasting time information, the receiving device descrambles the program using the decode data at the specified broadcasting time.

Figure 19:
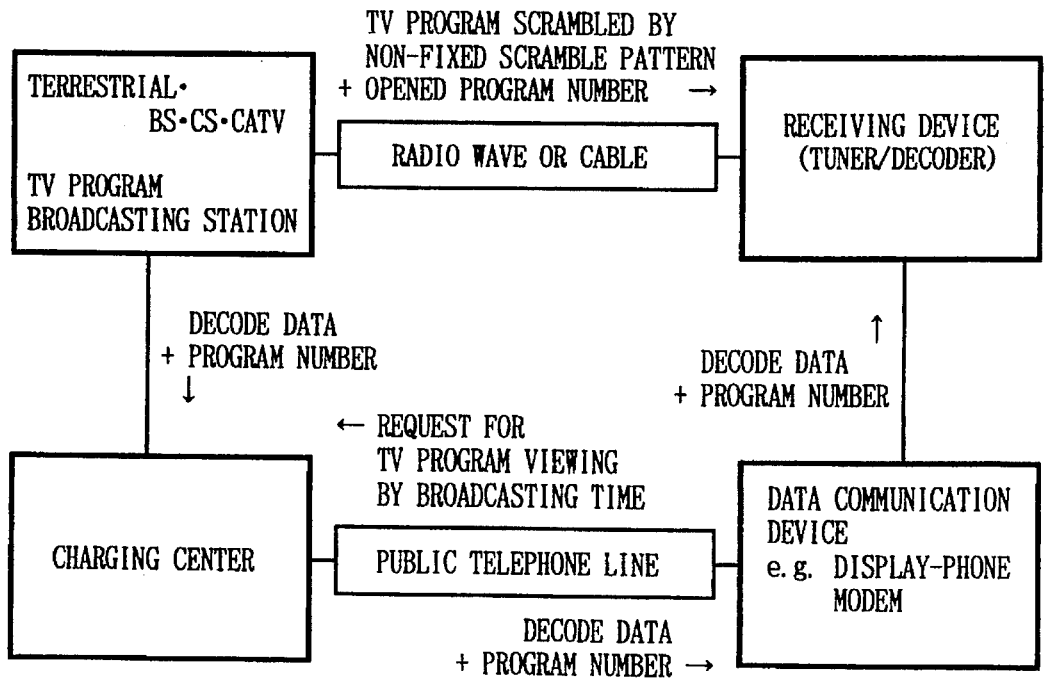
FIG. 19 is a diagram of a sixteenth embodiment of the present invention.
Figure 20:
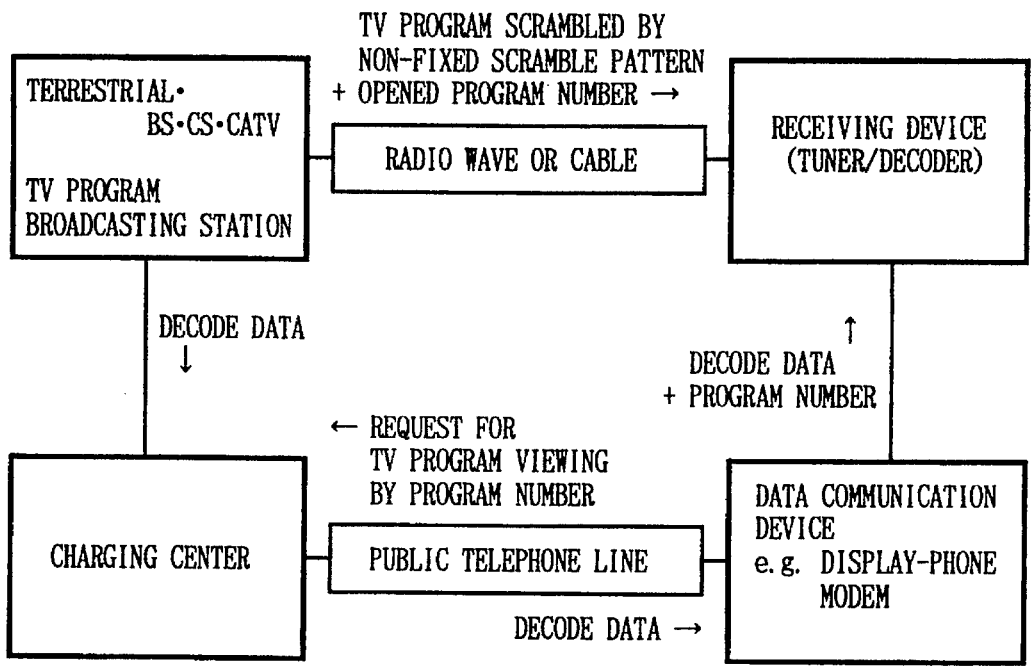
FIG. 20 is a diagram of a seventeenth embodiment of the present invention.

FIG. 19 and FIG. 20 each represents an embodiment in which open a program number is used as in FIG. 5 and FIG. 6.

In the embodiment of FIG. 19, the applicant for viewing sends a viewing request to the charging center by specifying the broadcasting time via public telephone line using the data communication device.

The broadcasting station sends the program number to the charging center before the program is broadcast.

The charging center sends the decode data and the program number of the requested program to the data communication device via public telephone line.

The data communication device sends the received program number and the decode data to the receiving device.

Upon receipt of the decode data and the program number, the receiving device monitors program number of the receiving program and descrambles the program using the received decode data when the program number of the requested program is detected.

In the embodiment of FIG. 20, the applicant for viewing sends a viewing request to the charging center by specifying the program number via public telephone line using the data communication device.

The charging center sends the decode data of the requested program to the data communication device via public telephone line and also collects a fee for the program.

The data communication device sends the program number and the received decode data to the receiving device.

Upon receipt of the program number, the receiving device monitors program number of the receiving program and descrambles the program using the received decode data when the program number of the requested program is detected.

Figure 21:
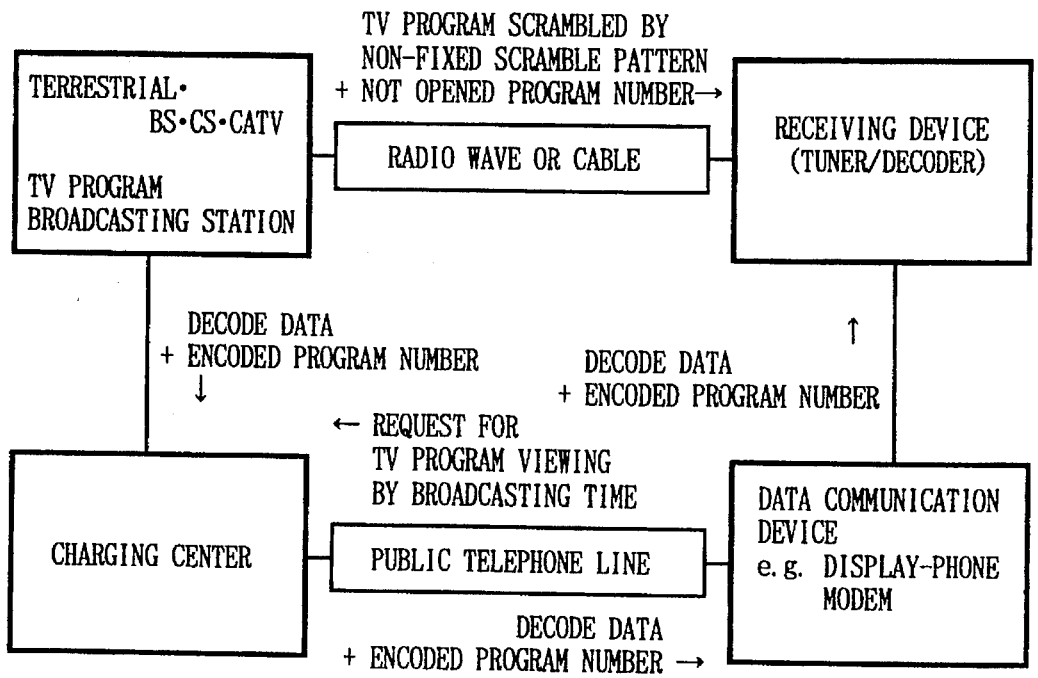
FIG. 21 is a diagram of an eighteenth embodiment of the present invention.
Figure 22:
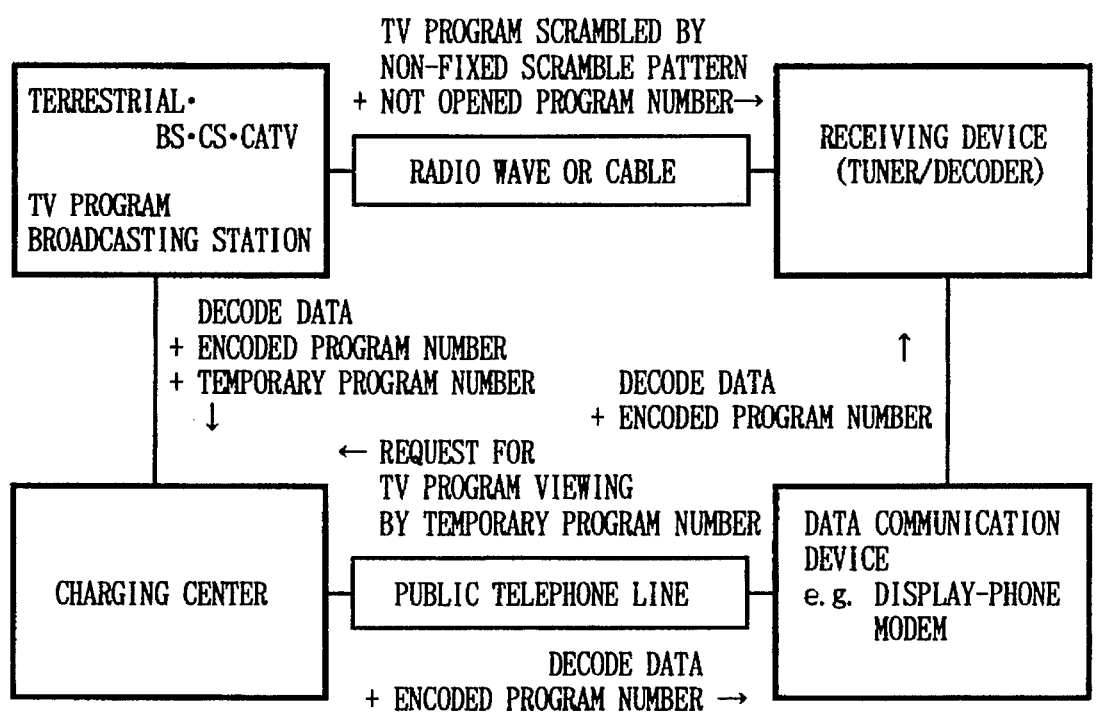
FIG. 22 is a diagram of a nineteenth embodiment of the present invention.

In the embodiments of FIG. 21 and FIG. 22, a non-opened program number is used as in the embodiments of FIG. 7 and FIG. 8. In these embodiments, the non-opened program number is encoded and is sent to the charging center before the program is broadcast from the broadcasting station.

In the embodiment of FIG. 21, the applicant for viewing sends a viewing request to the charging center by specifying broadcasting time via public telephone line using the data communication device.

The charging center sends decode data of the requested program and an encoded program number to the data communication device via public telephone line and also collects a fee for the program.

The data communication device sends the received decode data and the encoded program number to the receiving device.

Upon receipt of the decode data and the encoded program number, the receiving device monitors the non-opened program number of the receiving program and descrambles the program using the received decode data when the encoded program number of the requested program agrees with the non-opened program number.

In the embodiment of FIG. 22, the encoded program number is provided with a temporary program number as in the embodiment of FIG. 8, and the broadcasting station sends this temporary program number to the charging center before the program is broadcast.

The applicant for viewing sends a viewing request to the charging center by specifying a temporary program number via public telephone line using the data communication device.

The charging center sends decode data of the requested program and an encoded program number corresponding to the temporary program number to the data communication device via public telephone line and also collects a fee for the program.

The data communication device sends the received decode data and the encoded program number to the receiving device.

Upon receipt of the decode data and the encoded program number, the receiving device monitors non-opened program number of the receiving program and descrambles the program by the received decode data when the encoded program number of the requested program agrees with the non-opened program number.

As means for preparing the scramble code, the encoding method disclosed in Japanese Patent Application 4-164380, invented by the inventor of the present invention and filed by the applicant of the present application, may be used to ensure the security of the scramble code.

In the embodiments as described above, data relating to time is limited to "hour". As already explained, however, time information such as month, day, and hour is broadcast together with the program in pay satellite television broadcasting.

By utilizing the above time information, it is possible to achieve pay-per-view in hour, day, week or month.

Figure 1:
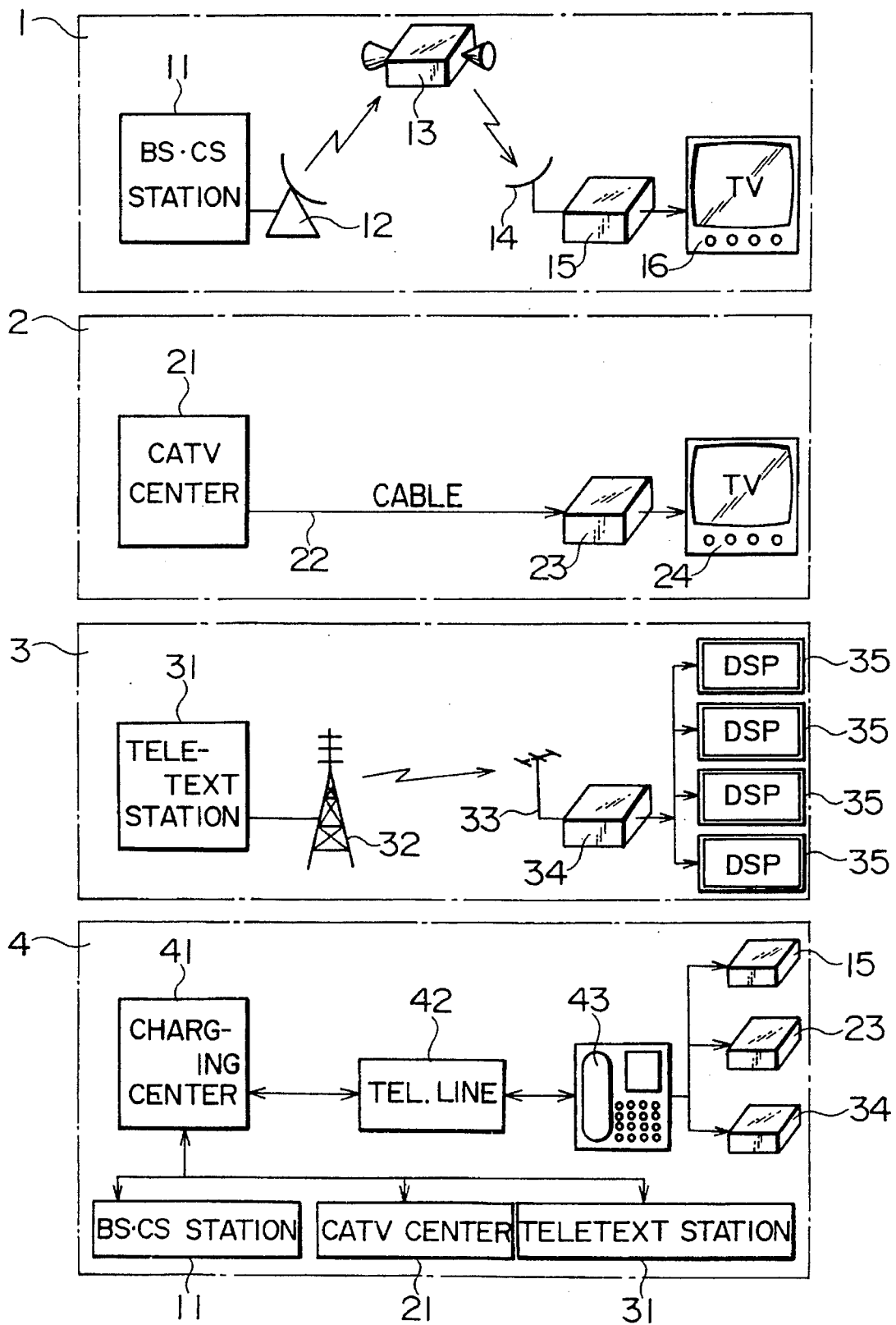
FIG. 1 is a general block diagram of a system, to which the present invention is applied.
Figure 2:
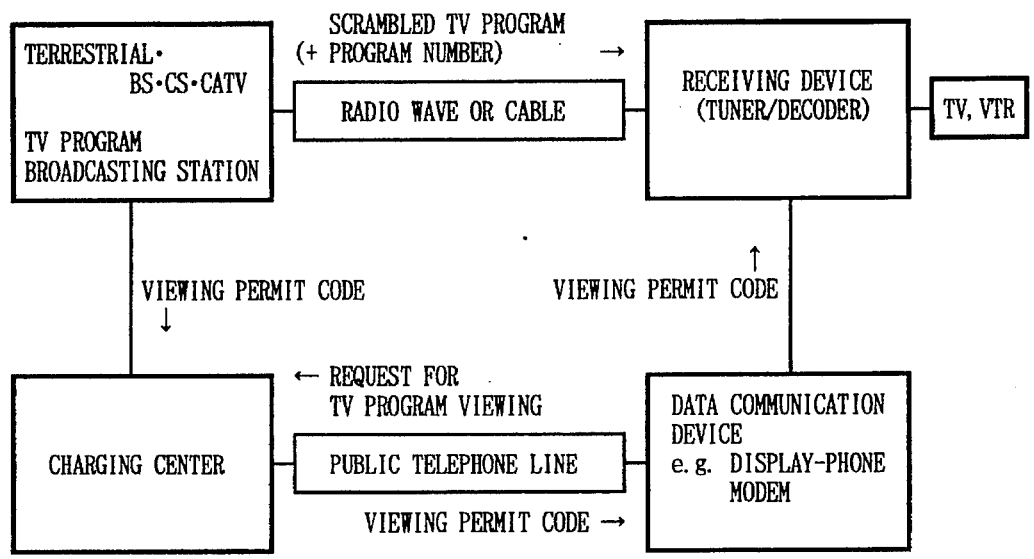
FIG. 2 is a schematic diagram of the present invention.
Figure 3:
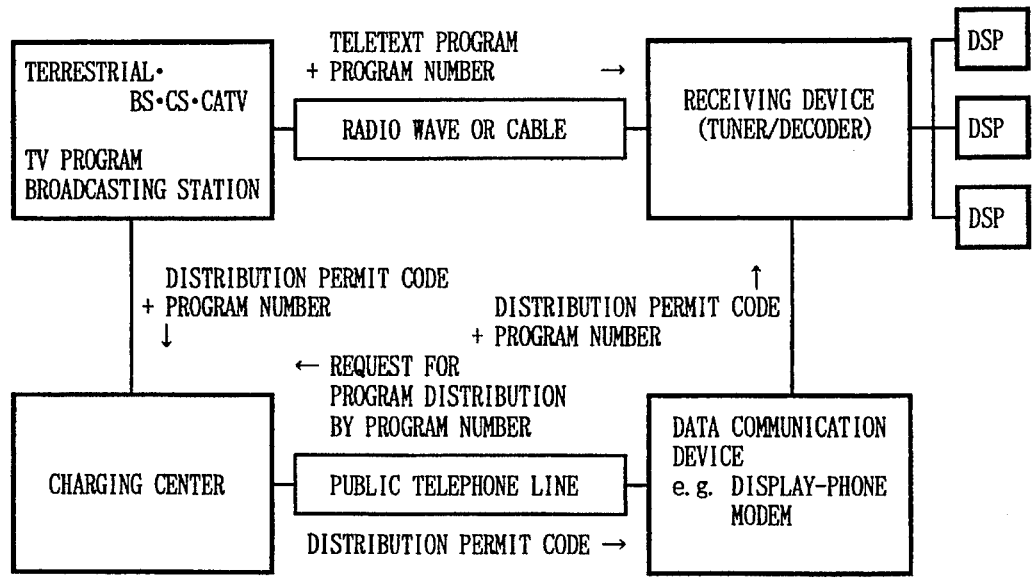
FIG. 3 is another schematic diagram of the present invention.

In FIG. 1, a display phone is used as the data communication device 43, while the data communication device may include a telephone set capable of achieving data communication, such as a pushbutton telephone, portable telephone, etc., or a device such as personal computer or word-processor coupled to a modem.

In the embodiments as described above, description has been given on the charging system for television broadcasting. However, the present system can be applied to the other information transmitting means which require charging a fee for each program, for example, broadcasting and communication means utilizing satellite such as audio broadcasting or data broadcasting, data communication, etc. or various broadcasting and communication means utilizing terrestrial waves such as audio broadcasting or data broadcasting and data communication such as FM multiplex broadcasting.

Also, in case of data broadcasting, in which the secondary use of the broadcasting program is offered on a pay basis, a fee can be easily collected without fail if the system of the present invention is applied.

When requesting for viewing the program, it is possible to use program code system currently adopted for video tape recording.

By the method to include program code in the broadcasting program as described in the above embodiments, it is possible not only to view the scrambled pay program but also to more reliably perform video tape recording and television receiving of the program offered free if program code is monitored on the receiver side and video tape recording or television receiving is controlled by the program code.

In the above, a charging system for each broadcasting program, i.e., a pay broadcasting system for actualizing pay-per-program, has been described.

What is claimed is:

1. A pay broadcasting system, comprising a broadcasting station and a charging center, whereby:

said broadcasting station transmits an open program number together with a broadcasting program scrambled by a scramble pattern changed for each program;

said charging center sends a use permit code for using a pay program in response to a request for using executed through a communication line by specifying said open program number and also collects a fee for said pay program; and a receiving device descrambles a received pay program according to said use permit code upon receipt of said use permit code.

2. The pay broadcasting system of claim 1 wherein said using said pay program is viewing said pay program, and said use permit code is a viewing permit code.

3. The pay broadcasting system of claim 2 wherein a decode data is sent as said viewing permit code.

4. The pay broadcasting system of claim 2 wherein a decode data and said open program number are sent as said viewing permit code.

5. The pay broadcasting system of claim 1 wherein said using said pay program is distributing said pay program, and said use permit code is a distribution permit code.

6. The pay broadcasting system of claim 5 wherein a decode data is sent as said distribution permit code.

7. The pay broadcasting system of claim 5 wherein a decode data and said open program number are sent as said distribution permit code.

* * * * *